(12) United States Patent
Jeon et al.

(10) Patent No.: US 12,469,564 B2
(45) Date of Patent: Nov. 11, 2025

(54) MEMORY DEVICE AND OPERATING METHOD OF THE MEMORY DEVICE

(71) Applicant: SK hynix Inc., Icheon-si (KR)

(72) Inventors: Nam Cheol Jeon, Icheon-si (KR); Chang Beom Woo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 63 days.

(21) Appl. No.: 18/428,275

(22) Filed: Jan. 31, 2024

(65) Prior Publication Data

US 2025/0095747 A1 Mar. 20, 2025

(30) Foreign Application Priority Data

Sep. 14, 2023 (KR) .................. 10-2023-0122267

(51) Int. Cl.
*G11C 16/14* (2006.01)
*G11C 16/04* (2006.01)
*G11C 16/24* (2006.01)

(52) U.S. Cl.
CPC .......... *G11C 16/14* (2013.01); *G11C 16/0433* (2013.01); *G11C 16/24* (2013.01)

(58) Field of Classification Search
CPC ..... G11C 16/14; G11C 16/0433; G11C 16/24; G11C 16/0483; G11C 16/08; G11C 16/16; G11C 16/32; G11C 16/34; G11C 7/18; G11C 8/12; G11C 8/14; G11C 16/30
USPC ......................................... 365/185.24, 185.29
See application file for complete search history.

(56) References Cited

U.S. PATENT DOCUMENTS

| | | | | |
|---|---|---|---|---|
| 10,373,697 | B1 * | 8/2019 | Lai ...................... | G11C 11/5635 |
| 10,381,083 | B1 * | 8/2019 | Yang ..................... | G11C 16/30 |
| 10,790,009 | B1 * | 9/2020 | Chen .................... | G11C 7/1048 |
| 2012/0051136 | A1 * | 3/2012 | Kang ..................... | G11C 16/16 365/185.17 |
| 2012/0063223 | A1 * | 3/2012 | Lee ..................... | G11C 16/3436 365/185.05 |
| 2017/0271021 | A1 * | 9/2017 | Futatsuyama .......... | G11C 16/10 |
| 2017/0372786 | A1 * | 12/2017 | Lee ....................... | G06F 1/3275 |
| 2018/0151230 | A1 * | 5/2018 | Park ..................... | G11C 16/32 |
| 2018/0158505 | A1 * | 6/2018 | Lee ....................... | G11C 16/16 |
| 2019/0371408 | A1 * | 12/2019 | Yu ......................... | G11C 16/24 |
| 2020/0381057 | A1 * | 12/2020 | Park ..................... | G06F 3/0652 |
| 2020/0411107 | A1 * | 12/2020 | Yu ......................... | G11C 16/26 |
| 2022/0051739 | A1 * | 2/2022 | Hwang .................. | G11C 16/30 |
| 2022/0208246 | A1 * | 6/2022 | Choi ..................... | G11C 11/4096 |
| 2022/0215886 | A1 * | 7/2022 | Lim ....................... | G11C 16/28 |
| 2022/0319604 | A1 * | 10/2022 | Chae ..................... | G11C 5/147 |

FOREIGN PATENT DOCUMENTS

| | | |
|---|---|---|
| KR | 1020220026451 A | 3/2022 |
| KR | 1020220039956 A | 3/2022 |
| KR | 1020230016270 A | 2/2023 |

* cited by examiner

*Primary Examiner* — Michael T Tran
(74) *Attorney, Agent, or Firm* — WILLIAM PARK AND ASSOCIATES LTD.

(57) ABSTRACT

An embodiment of the present disclosure relates to a memory device configured to: apply an erase voltage and a first pass voltage at a first time, apply a turn-on voltage at a second time before a level of the erase voltage increases to a target level, maintain the erase voltage, the first pass voltage, and the turn-on voltage at a third time when the level of the erase voltage equals the target level, and reduce a voltage difference between a memory cell and a word line at a fourth time after the third time.

13 Claims, 10 Drawing Sheets

MEMORY DEVICE AND OPERATING METHOD OF THE MEMORY DEVICE

CROSS-REFERENCE TO RELATED APPLICATION

The present application claims priority under 35 U.S.C. § 119 (a) to Korean patent application number 10-2023-0122267 filed on Sep. 14, 2023, in the Korean Intellectual Property Office, the entire disclosure of which is incorporated by reference herein.

BACKGROUND

1. Technical Field

Various embodiments of the present disclosure relate generally to a memory device and a method of operating the memory device and, more particularly, to an erase operation of the memory device.

2. Related Art

A memory device may include a memory cell array which stores data, a peripheral circuit which is configured to perform a program, read, or erase operation with the memory cell array, and a control circuit which controls the peripheral circuit.

The memory cell array may include a plurality of memory blocks. Each of the plurality of memory blocks may include a plurality of memory cells. A memory device which has a three-dimensional structure may include memory cells which are stacked on a substrate. For example, the three-dimensionally structured memory device may include cell plugs which are perpendicular to the substrate. The cell plugs may include select transistors which are coupled between bit lines and a source line and memory cells which are coupled between the select transistors. The memory cells and the select transistors between the bit lines and the source line may form strings.

The memory cells may be divided into a program state or an erase state, depending on threshold voltages thereof. For example, memory cells having threshold voltages which are greater than a reference voltage may be classified as memory cells in a program state, and memory cells having threshold voltages which are lower than the reference voltage may be classified as memory cells in an erase state.

A program operation may be performed to increase threshold voltages of memory cells in an erase state to a program state. Since memory cells have different electrical characteristics, the memory cells may have different levels of threshold voltages even when the same program voltage is applied to the memory cells. As a result, the memory cells may have a threshold voltage distribution. A distribution of threshold voltages of memory cells may be defined when the memory cells have different threshold voltages since the threshold voltages of the memory cells may increase or decrease at different speeds.

An erase operation may be performed by supplying an erase voltage to a channel, or by a gate induced drain leakage (GIDL) method. According to the GIDL method, memory cells may be erased using leakage of a drain region. By supplying an erase voltage to a channel, memory cells may be erased using a voltage difference between the erase voltage applied to the channel and a word line. According to the GIDL method, the erase voltage may be supplied through at least one of the source line and the bit line.

However, when the erase voltage is increased more than necessary, some electrons of the word line may move to the memory cells, i.e., back-tunneling may occur. As a result, the erase operation may be performed abnormally.

SUMMARY

According to an embodiment, a memory device may include a first select transistor, a memory cell, and a second select transistor coupled in series between a source line and a bit line; and a peripheral circuit configured to perform an erase operation on the memory cell, wherein the peripheral circuit is configured to, during the erase operation: apply an erase voltage to the source line and the bit line and a first pass voltage to a word line coupled to the memory cell at a first time, apply a turn-on voltage to a first select line coupled to the first select transistor and a second select line coupled to the second select transistor at a second time before a level of the erase voltage applied to the source line and the bit line increases to a target level, erase the memory cell by maintaining the erase voltage, the first pass voltage, and the turn-on voltage at a third time when the level of the erase voltage applied to the source line and the bit line equals the target level, and erase the memory cell by reducing a voltage difference between the memory cell and the word line at a fourth time after the third time.

According to an embodiment, a method of operating a memory device may include applying an erase voltage to a source line and a bit line, applying a turn-off voltage to first and second select lines between the source line and the bit line, and applying a first pass voltage to a word line between the first and second select lines, applying a turn-on voltage to the first and second select lines before a level of the erase voltage equals a target level, and applying a second pass voltage greater than the first pass voltage to the word line after a predetermined time from a time when the level of the erase voltage equals the target level.

According to an embodiment, a method of operating a memory device may include applying an erase voltage to a source line and a bit line, applying a turn-off voltage to first and second select lines between the source line and the bit line, and applying a pass voltage to a word line between the first and second select lines, applying a turn-on voltage to the first and second select lines before a level of the erase voltage equals a target level, and floating the word line after a predetermined time from a time when the level of the erase voltage equals the target level.

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Hereinafter, use of ordinal terms such as "first," "second," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The word "predetermined" as used herein with respect to a parameter, such as a predetermined time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Various embodiments of the present disclosure provide for a memory device capable of preventing or mitigating a back-tunneling phenomenon during an erase operation of the memory device, and an operating method of preventing or mitigating a back-tunneling phenomenon during an erase operation of the memory device.

Figure 1:
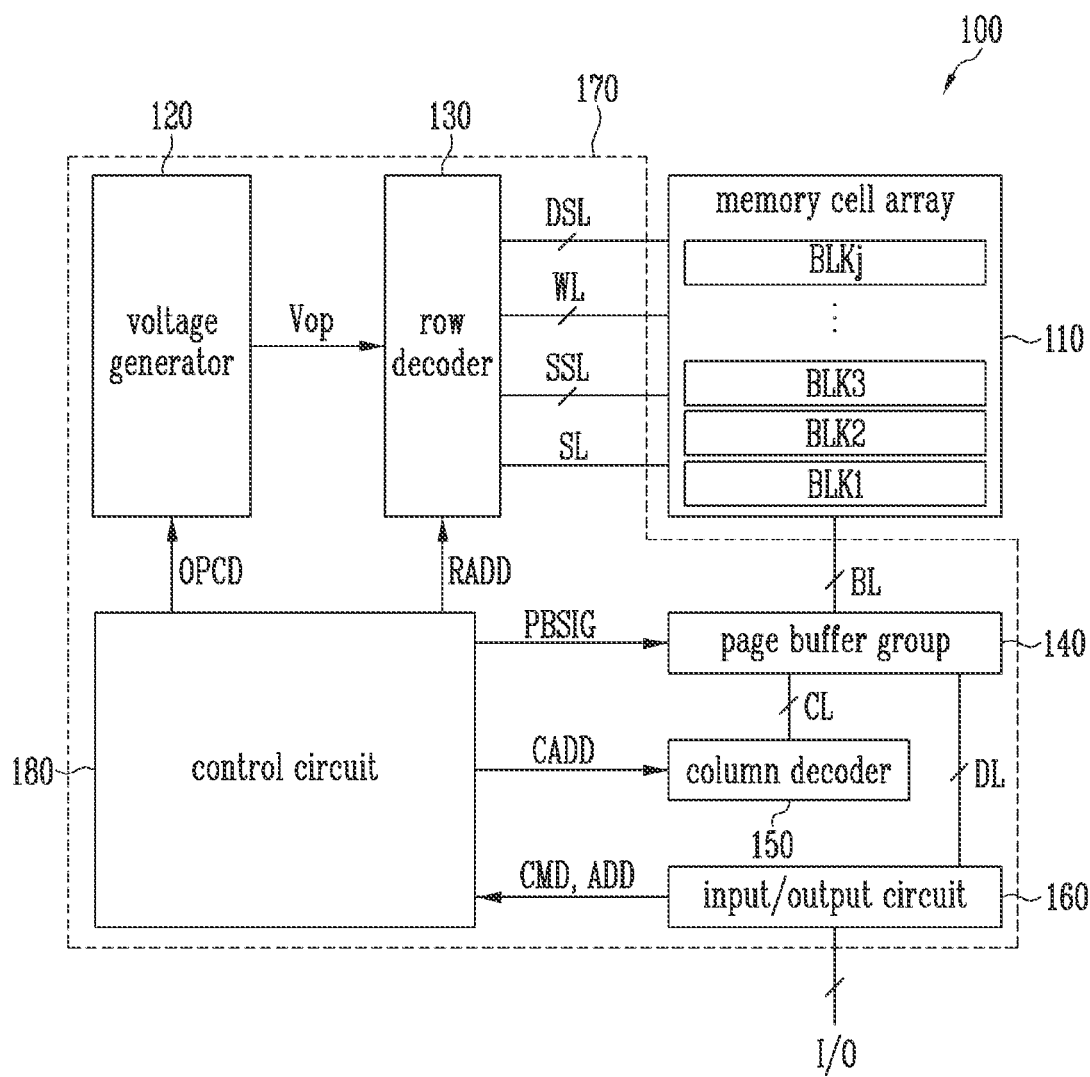
FIG. 1 is a diagram illustrating an embodiment of a memory device.

FIG. 1 is a block diagram illustrating an embodiment of a memory device 100 according to the present disclosure.

Referring to FIG. 1, the memory device 100 may include a memory cell array 110 and a peripheral circuit 170.

The memory cell array 110 may include first to jth memory blocks BLK1 to BLKj. Each of the first to jth memory blocks BLK1 to BLKj may include memory cells which store data. Drain select lines DSL, word lines WL, source select lines SSL, and a source line SL may be coupled to each of the first to jth memory blocks BLK1 to BLKj. Bit lines BL may be commonly coupled to the first to jth memory blocks BLK1 to BLKj. The first to jth memory blocks BLK1 to BLKj may have a three-dimensional structure. The memory blocks having the three-dimensional structure may include memory cells which are stacked on a substrate.

Each of the memory cells may include 1-bit data or two or more bits of data according to a program method. For example, a method of storing one bit in a single memory cell is referred to as a single-level cell method, and a method of storing two bits of data in a single memory cell is referred to as a multi-level cell method. A method of storing three bits of data in a single memory cell is referred to as a triple-level cell method. A method of storing four bits of data in a single memory cell is referred to as a quad-level cell method. Further, five or more bits of data may be stored in a single memory cell.

The peripheral circuit 170 may perform a program operation for storing data in the memory cell array 110, a read operation for outputting data stored in the memory cell array 110, and an erase operation for erasing data stored in the memory cell array 110. For example, the peripheral circuit 170 may include a voltage generator 120, a row decoder 130, a page buffer group 140, a column decoder 150, an input/output circuit 160, and a control circuit 180.

The voltage generator 120 may generate various operating voltages Vop applied to perform a program operation, a read operation, or an erase operation in response to an operating code OPCD. For example, the voltage generator 120 may be configured to generate program voltages, turn-on voltages, turn-off voltages, precharge voltages, negative voltages, verify voltages, read voltages, pass voltages, or erase voltages in response to the operating code OPCD. The operating voltages Vop generated by the voltage generator 120 may be applied to drain select lines DSL, word lines WL, source select lines SSL, and the source line SL of a selected memory block through the row decoder 130.

Program voltages may be applied to a selected word line, among the word lines WL, during a program operation and may be used to increase threshold voltages of memory cells coupled to the selected word line. Turn-on voltages may be applied to the drain select lines DSL or the source select lines SSL and used to turn off drain select transistors or source select transistors. Turn-off voltages may be applied to the drain select lines DSL or the source select lines SSL and used to turn on the drain select transistors or the source select transistors. For example, a turn-off voltage may be set to 0 V. A precharge voltage may be applied to the source line and used to increase a channel voltage of unselected strings during a soft program operation or a normal program operation. Negative voltages may be set to be less than 0 V. Verify voltages may be used during a verify operation for determining whether threshold voltages of selected memory cells have increased to a target level or not. The verify voltages may be set to various levels depending on the target level and applied to the selected word line. Read voltages may be applied to the selected word line during a read operation of selected memory cells. Pass voltages may be applied to word lines during a read or erase operation and used to turn on memory cells coupled to the word lines. Erase voltages may be used during an erase operation for erasing memory cells included in the selected memory block and may be applied to the source line SL.

The voltage generator 120 may control levels of the voltages applied to the drain select lines DSL, the word lines WL, the source select lines SSL, and the source line SL, and times when these voltages are output. The voltage generator 120 may discharge lines to which the operating voltages Vop are applied, and may control times when these voltages are discharged. The voltage generator 120 may float selected lines.

The row decoder 130 may be configured to apply the operating voltages Vop to the drain select lines DSL, the word lines WL, the source select lines SSL, and the source line SL which are coupled to the selected memory block according to a row address RADD. For example, the row decoder 130 may be coupled to the voltage generator 120 through global lines and to the first to jth memory blocks BLK1 to BLKj through the drain select lines DSL, the word lines WL, the source select lines SSL, and the source line SL.

The page buffer group 140 may include page buffers (not shown) which are coupled to the first to jth memory blocks BLK1 to BLKj through the bit lines BL. During a program operation, program data which is transferred from the input/output circuit 160 may be stored in the page buffer group 140. The page buffer group 140 may apply a program permission voltage or a program inhibition voltage to the bit lines BL according to the program data in response to the page buffer control signals PBSIG. During a verify operation, the page buffer group 140 may sense currents or voltages which vary depending on the threshold voltages of the selected memory cells, and may store the sensed data.

The column decoder 150 may be configured to transfer data between the page buffer group 140 and the input/output circuit 160 in response to a column address CADD. For example, the column decoder 150 may be coupled to the page buffer group 140 through column lines CL and transfer enable signals through the column lines CL. The page buffers (not shown) included in the page buffer group 140 may receive or output data through data lines DL in response to the enable signals.

The input/output circuit 160 may transmit and receive a command CMD, an address ADD, or data through input/output lines I/O. For example, the input/output circuit 160 may transfer the command CMD and the address ADD, which are received from the external device through the input/output lines I/O, to the control circuit 180, and may transfer the data, which is received from the external controller through the input/output lines I/O, to the page buffer group 140. Alternatively, the input/output circuit 160 may output the data, which is transferred from the page buffer group 140, to the external controller through the input/output lines I/O.

The control circuit 180 may output the operating code OPCD, the row address RADD, the page buffer control signals PBSIG, and the column address CADD in response to the command CMD and the address ADD. For example, when the command CMD which is input to the control circuit 180 corresponds to a program operation, the control circuit 180 may control the peripheral circuit 170 to perform a program operation of a selected memory block according to the address ADD. When the command CMD which is input to the control circuit 180 corresponds to a read operation, the control circuit 180 may control the peripheral circuit 170 to perform a read operation of the selected memory block by the address and may output the read data. When the command CMD which is input to the control circuit 180 corresponds to an erase operation, the control circuit 180 may control the peripheral circuit 170 to perform an erase operation of the selected memory block.

According to an embodiment, the control circuit 180 may control the peripheral circuit 170 to adjust the voltages applied to the word lines such that back-tunneling might not occur in the memory cells.

Figure 2:
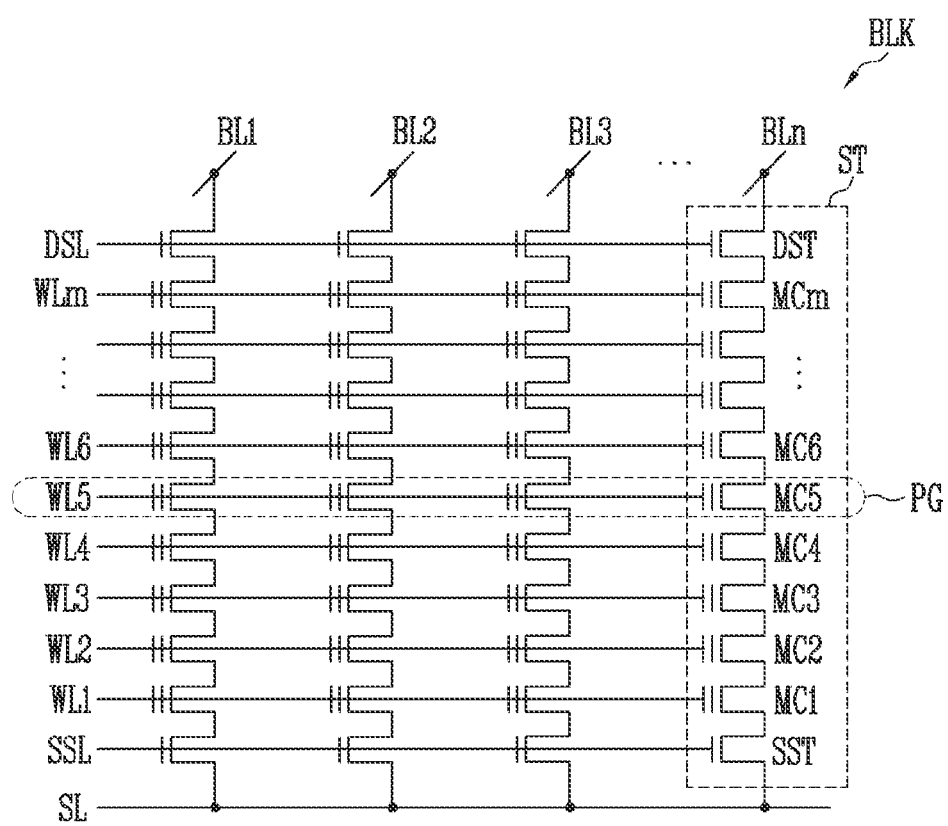
FIG. 2 is a circuit diagram illustrating an embodiment of a memory block.

FIG. 2 is a circuit diagram illustrating an embodiment of a memory block.

Referring to FIG. 2, a memory block BLK may be any one of the first to jth memory blocks BLK1 to BLKj as shown in FIG. 1. The memory block BLK may include strings ST which are coupled between first to nth bit lines BL1 to BLn and a source line SL. For example, the strings ST may be commonly coupled to the source line SL and may be coupled to the first to nth bit lines BL1 to BLn, respectively. The structure of the strings ST which are coupled between the nth bit line BLn and the source line SL is described below as an example.

The string ST may include a source select transistor SST, memory cells MC1 to MCm, and a drain select transistor DST which are coupled between the source line SL and the nth bit line BLn. The string ST shown in FIG. 2 is shown as an example for illustrating the configuration of the memory block BLK. The numbers of source select transistors SST, memory cells MC1 to MCm, and drain select transistors DST may vary depending on memory devices. In addition, dummy cells may be further included in portions between the source select transistor SST, the memory cells MC1 to MCm, and the drain select transistor DST. In an embodiment, the dummy cells may be used to prevent or mitigate electric deterioration or improve electrical characteristics of the string ST and may store dummy data without storing normal data. The normal data may be stored in the memory cells MC1 to MCm.

The source select transistor SST may electrically couple or block the source line SL and the memory cell MC1. Gates of the source select transistors SST included in different strings ST may be coupled to the source select line SSL. The memory cells MC1 to MCm may store the normal data. Gates of the memory cells MC1 to MCm included in different strings ST may be coupled to word lines WL1 to WLm, respectively. A group of memory cells coupled to the same word line may form a page PG. A program operation or a read operation may be performed in units of pages. The drain select transistor DST may electrically couple or block the bit lines BL1 to BLn and the mth memory cell MCm. Gates of the drain select transistors DST included in different strings ST may be coupled to the drain select line DSL.

During an erase operation, an erase voltage may be applied to the source line SL and the first to nth bit lines BL1 to BLn. Alternatively, the erase voltage may be applied only to the source line SL, or only to the first to nth bit lines BLn. A turn-on voltage may be applied to the source select line SSL and the drain select line DSL to turn on the source select transistors SST and the drain select transistors DST. A 0 V or a pass voltage for turning on the memory cells MC1 to MCm may be applied to the word lines WL1 to WLm. The pass voltage may be a positive voltage, the turn-on voltage may be a positive voltage greater than the pass voltage, and the erase voltage may be a positive voltage greater than the turn-on voltage.

Figure 3:
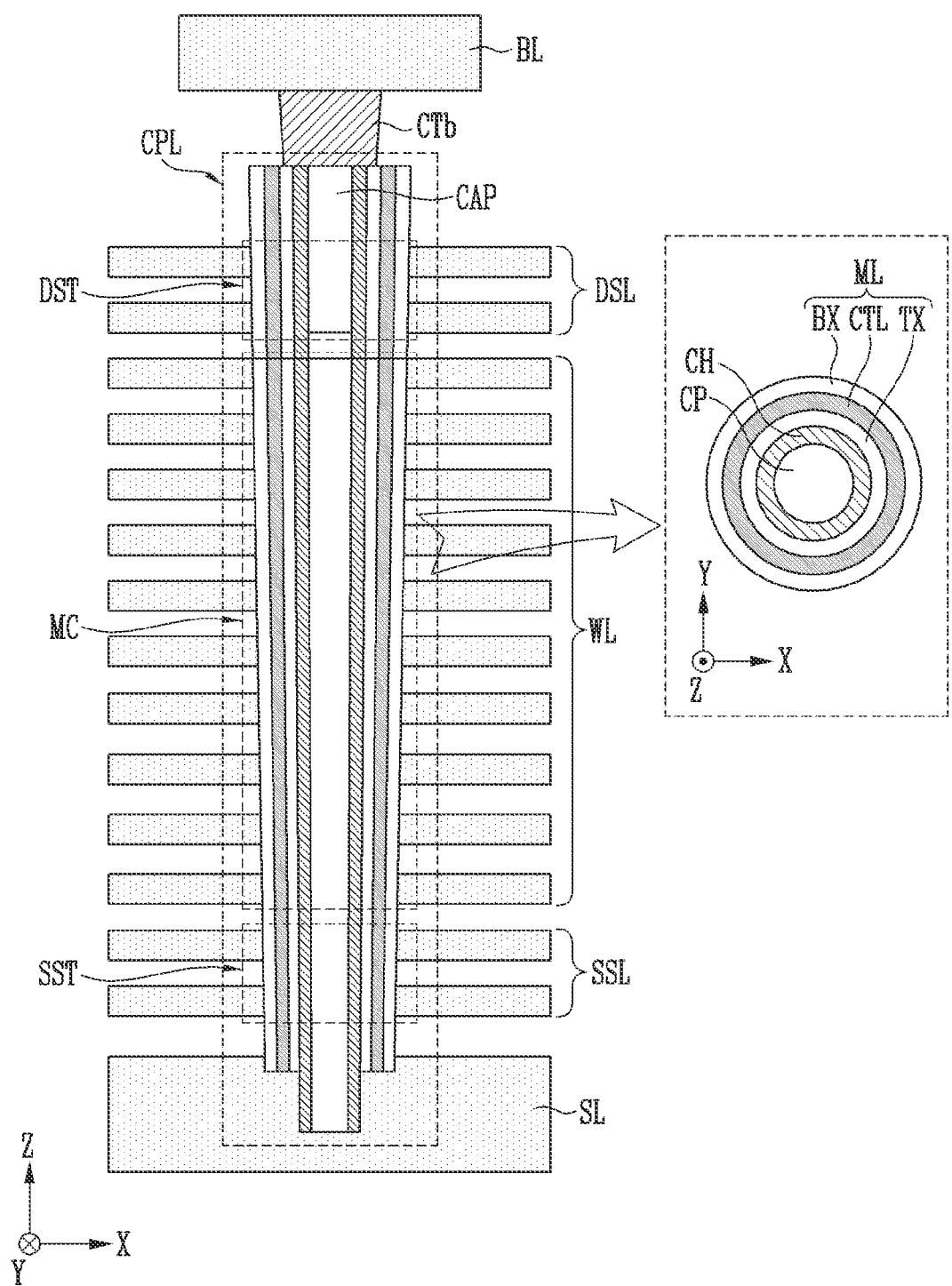
FIG. 3 is a cross-sectional diagram illustrating an embodiment of a memory block.

FIG. 3 is a cross-sectional diagram illustrating an embodiment of a memory block. Referring to FIG. 3, a memory block may include the source line SL, the source select lines SSL, the word lines WL, the drain select lines DSL, and the bit line BL. FIG. 3 shows a portion of the memory block. Thus, the numbers of source lines SL, source select lines SSL, word lines WL, drain select lines DSL, and bit line BL are not limited to those shown in FIG. 3.

The source select lines SSL, the word lines WL, and the drain select lines DSL may be stacked separately from each other over the source line SL. A substrate or a peripheral circuit may be located under the source line SL. A cell plug CPL may pass through the drain select lines DSL, the word lines WL, and the source select lines SSL and contact the source line SL. A bit line contact CTb may be located between the cell plug CPL and the bit line BL. The source line SL, the source select lines SSL, the word lines WL, the drain select lines DSL, the bit line contact CTb, and the bit line BL may include a conductive material. The source select lines SSL, the word lines WL, and the drain select lines DSL may include a metallic material such as tungsten (W), molybdenum (Mo), cobalt (Co), or nickel (Ni), or a semiconductor material such as silicon (Si) or polysilicon (Poly-Si). However, the present disclosure is not limited thereto.

The cell plug CPL may include a core pillar CP, a channel layer CH, and a memory layer ML. The core pillar CP, the channel layer CH, and the memory layer ML may serve as the source select transistor SST, the memory cell MC, or the drain select transistor DST.

The memory layer ML may include a tunnel isolation layer TX, a charge trap layer CTL, and a blocking layer BX. The core pillar CP may have a cylindrical shape and include an insulating material or a conductive material. The channel layer CH may have a cylindrical shape which surrounds a side surface of the core pillar CP and may include polysilicon. The tunnel isolation layer TX may have a cylindrical shape which surrounds a side surface of the channel layer CH and may include an oxide layer. The charge trap layer CTL may have a cylindrical shape which surrounds a side surface of the tunnel isolation layer TX and may include a nitride layer. The blocking layer BX may have a cylindrical shape which surrounds a side surface of the charge trap layer CTL and may include an oxide layer.

A capping layer CAP, in an embodiment, for improving the electrical flow may be located at the drain select transistor DST above the core pillar CP. When the capping layer CAP is located above the core pillar CP, a position of a top surface of the core pillar CP may be lower than that of a top surface of the channel layer CH. Therefore, a side surface of the capping layer CAP may be surrounded by the channel layer CH. The capping layer CAP may include a conductive material. In the cell plug CPL which contacts the source line SL, portions of the channel layer CH and the core pillar CP may protrude downwards from the memory layer ML and contact the source line SL.

During an erase operation of the memory device, an erase voltage may be applied to the source line SL or the bit line BL, or to the source line SL and the bit line BL. When a turn-on voltage is applied to the source select lines SSL, a current path may be formed in the channel layer CH of the source select transistors SST, so that currents may flow therethrough. When a turn-off voltage is applied to the source select lines SSL, the current path may be blocked in the channel layer CH of the source select transistors SST, so that currents might not flow therethrough. When a turn-on voltage is applied to the drain select lines DSL, a current path may be formed in the channel layer CH of the drain select transistors DST, so that currents may flow therethrough. When a turn-off voltage is applied to the drain select lines DSL, the current path may be blocked in the channel layer CH of the drain select transistors DST, so that currents might not flow therethrough. When a pass voltage is applied to the word lines WL, a current path may be formed in the channel layer CH of memory cells MC. During an erase operation using a GIDL method, since leakage of the channel layer CH is used, the erase operation may be performed even when the pass voltage is not applied to the word lines WL.

Figure 4A:
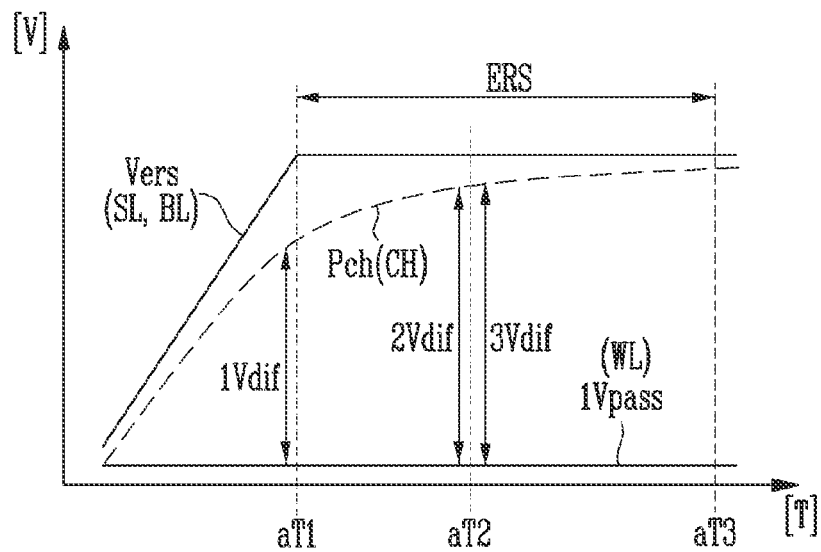
FIGS. 4A, 4B, and 4C are diagrams illustrating a back-tunneling phenomenon which may occur during an erase operation.
Figure 4B:
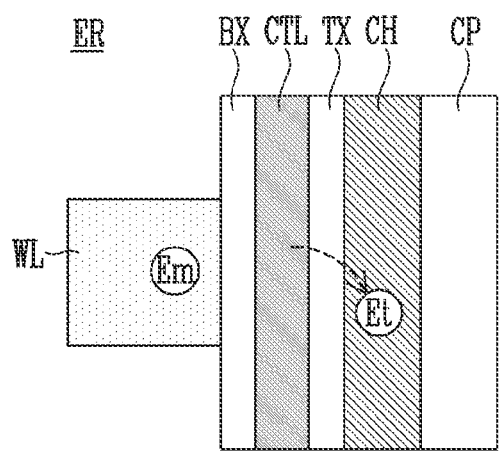
Figure 4C:
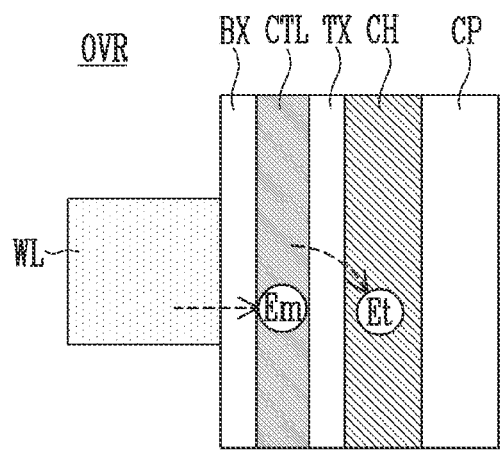

FIGS. 4A to 4C are diagrams illustrating a back-tunneling phenomenon which may occur during an erase operation. The erase period ERS may be from a first time aT1 to a third time aT3.

Referring to FIG. 4A, when an erase operation starts, a first pass voltage 1Vpass may be applied to the word lines WL and an erase voltage Vers may be applied to the source line SL and the bit line BL. The first pass voltage 1Vpass may be a positive voltage greater than 0 V. The erase voltage Vers may be a positive voltage greater than the first pass voltage 1Vpass.

Although the erase voltage Vers is applied to the source line SL and the bit line BL, it may take time for the erase voltage Vers applied to the source line SL and the bit line BL to reach a target level. For example, the erase voltage Vers may be applied to the source line SL and the bit line BL, and a level of the erase voltage Vers may be increased to the target level by a first time aT1. While the erase voltage Vers applied to the source line SL and the bit line BL is increased to the target level, a channel potential Pch of the channel layer CH may be increased accordingly. The channel potential Pch may be an electrical potential energy of the channel layer CH. A potential difference between the word lines WL and the channel layer CH may also be increased by the first time aT1 when the channel potential Pch is increased. Before the level of the erase voltage Vers reaches the target level, a maximum potential difference between the word lines WL and the channel layer CH may be a first potential difference 1Vdif, and the memory cells might not be erased when the potential difference therebetween is the first potential difference 1Vdif or less.

Referring to FIGS. 4A and 4B, the potential difference between the word lines WL and the channel layer CH may be greater than the first potential difference 1Vdif after the first time aT1 when the erase voltage Vers applied to the source line SL and the bit line BL has reached the target level. When the potential difference is greater than the first potential difference 1Vdif, electrons trapped in the memory cells may be tunneled into the channel layer CH due to the potential difference and the memory cells may be erased. For example, when the channel potential Pch of the channel layer CH increases, electrons Et trapped in the charge trap layer CTL may pass through the tunnel isolation layer TX and move to the channel layer CH.

After the first time aT1, the channel potential Pch may have energy by which the electrons Et of the charge trap layer CTL are tunneled but might not be high enough to tunnel electrons Em of the word lines WL. Therefore, the electrons Em of the word lines WL may stay in the word lines WL without being tunneled to another layer adjacent thereto between the first time aT1 and a second time aT2.

While the erase voltage Vers having the target level is applied to the source line SL and the bit line BL, the channel potential Pch may be increased by the erase voltage Vers. After the first time aT1, a gradient of the channel potential Pch may be lower than before the first time aT1, and the channel potential Pch may be increased within a range less than the erase voltage Vers.

Referring to FIGS. 4A and 4C, when the channel potential Pch is too high, the electrons Em of the word lines WL as well as the electrons Et trapped in the charge trap layer CTL may be tunneled. For example, when the potential difference between the word lines WL and the channel potential Pch is greater than the first potential difference 1Vdif and less than the second potential difference 2Vdif when the potential difference increases after the first time aT1, only the electrons Et trapped in the charge trap layer CTL may be tunneled to the channel layer CH. However, the electrons Em of the word lines WL may be affected by the channel potential Pch and tunneled into the charge trap layer CTL between the second time aT2 and a third time aT3 when the potential difference is greater than the second potential difference 2Vdif. Therefore, during an erase operation, threshold voltages of memory cells may need to be reduced by tunneling only the electrons Et trapped in the charge trap layer CTL, but the threshold voltages of the memory cells might not be reduced to an erase state when the electrons Em of the word lines WL are back-tunneled to the charge trap layer CTL. As shown in FIG. 4A, the potential difference between the word lines WL and the channel potential Pch after the second time aT2 may be a third potential difference 3Vdif.

Figure 5:
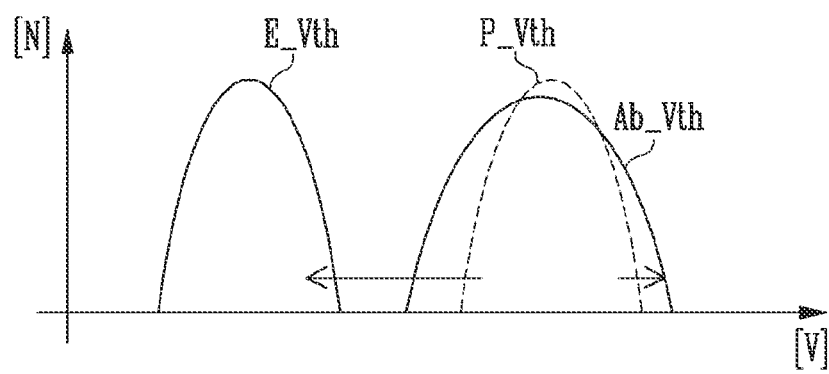
FIG. 5 is a diagram illustrating threshold voltage variations of memory cells caused by a back-tunneling phenomenon.

FIG. 5 is a diagram illustrating threshold voltage variations of memory cells caused by a back-tunneling phenomenon.

Referring to FIGS. 5 and 4C, an erase operation may be performed to reduce a threshold voltage P_Vth in a program state to a threshold voltage E_Vth in an erase state. However, when a back-tunneling phenomenon occurs in the memory cells, the threshold voltage P_Vth in the program state might not be lowered to the threshold voltage E_Vth in the erase state. Alternatively, when the number of electrons Em which are back-tunneled into the charge trap layer CTL from the word lines WL is greater than the number of electrons Et trapped in the channel layer CH from the charge trap layer CTL, the memory cells may have an abnormal threshold voltage Ab_Vth which is greater than the threshold voltage P_Vth in the program state.

As described above, during an erase operation, when a channel potential is greater than a reference potential, a back-tunneling phenomenon may occur in which electrons flow into memory cells from which electrons are supposed to be taken out to the outside. As a result, the erase operation may slow down or errors may occur during the erase operation. Therefore, a method of preventing or mitigating a back-tunneling phenomenon during an erase operation will be described below according to various embodiments.

Figure 6A:
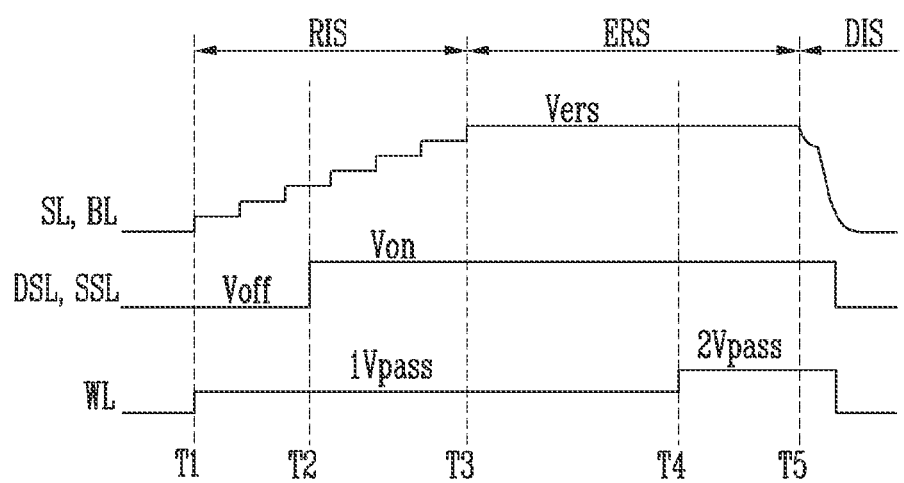
FIGS. 6A and 6B are diagrams illustrating an erase operation of a memory device according to a first embodiment.
Figure 6B:
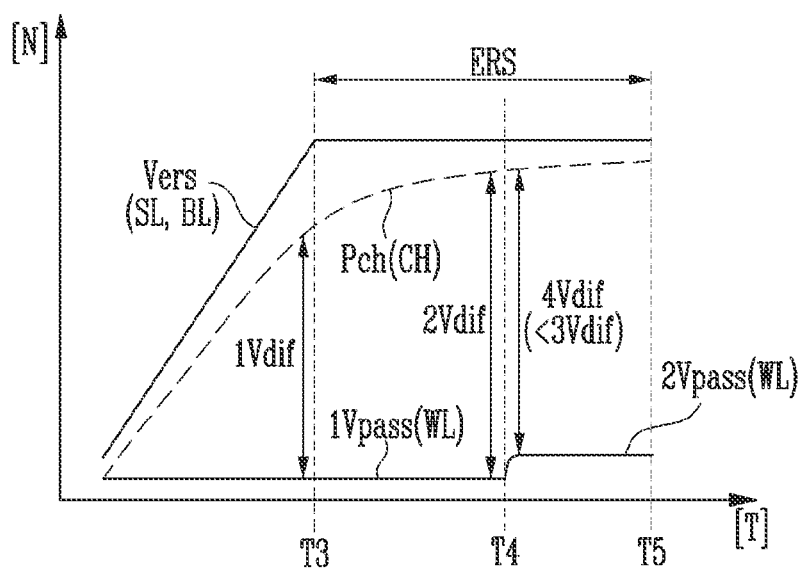

FIGS. 6A to 6B are diagrams illustrating an erase operation of a memory device according to a first embodiment.

Referring to FIGS. 6A and 6B, an erase operation may be divided into a voltage rise period RIS, an erase period ERS, and a discharge period DIS. During an erase operation, the voltage rise period RIS, the erase period ERS, and the discharge period DIS may proceed sequentially.

At a first time T1 when the voltage rise period RIS starts, a turn-off voltage Voff may be applied to the drain select line DSL and the source select line SSL, and a first pass voltage 1Vpass may be applied to the word lines WL. The turn-off voltage Voff may be 0 V. The first pass voltage 1Vpass may be a positive voltage greater than 0 V. The erase voltage Vers may be applied to the source line SL and the bit line BL. Since the erase voltage Vers is greater than the first pass voltage 1Vpass and is a high voltage for erasing memory cells, it would be difficult for the erase voltage Vers to have a target level from the time when the erase voltage Vers is applied to the source line SL and the bit line BL. Therefore, at the first time T1 when the erase voltage Vers starts to be applied to the source line SL and the bit lines BL, voltages of the source line SL and the bit line BL may have lower levels than the target level and may increase or increase gradually. The target level of the erase voltage Vers may be set to a level at which memory cells are erased.

The target level of the erase voltage Vers will be described below.

Electrons trapped in the memory cells may have a greater potential than the word lines WL and be tunneled into the channel layer CH due to the potential difference occurring at this time. The level of the erase voltage Vers which generates this potential difference may be set as a target level.

At a second time T2 before the level of the erase voltage Vers increases to the target level, a turn-on voltage Von may be applied to the drain select line DSL and the source select line SSL. The drain select transistor and the source select transistor may be turned on by the turn-on voltage Von, so that the source line SL and the bit line BL may be electrically coupled to the channel layer CH. As a result, the channel potential Pch of the channel layer CH may be increased. Although the channel potential Pch is increased, before a third time T3 when the erase voltage Vers increases to the target level, the memory cells might not be erased. Even when they are erased, the memory cells may be erased weaker than after the third time T3 when the erase voltage Vers increases to the target level. For example, during the voltage rise period RIS, when a maximum voltage difference between the word lines WL and the memory cells is a first voltage difference 1Vdif, electrons of the memory cells might not be tunneled by the first voltage difference 1Vdif. Even if they are tunneled, fewer electrons than after the third time T3 may be tunneled. A voltage difference between the word lines WL and the memory cells may correspond to a voltage difference between the word lines WL and the channel layer CH. Therefore, when the maximum voltage difference between the word lines WL and the channel layer CH is the first voltage difference 1Vdif, the memory cells might not be erased. Even when they are erased, the memory cells may be erased weaker than after the third time T3 when the erase voltage Vers increases to the target level.

The erase period ERS may start from the third time T3 when the erase voltage Vers increases to the target level. From the third time T3, the erase voltage Vers having the target level may be maintained in the source line SL and the bit line BL. Even when the erase voltage Vers has the target level, the channel potential Pch may increase at a lower speed than the voltage of the source line SL and the bit line BL. As a result, the channel potential Pch may gradually increase even after the third time T3.

After the third time T3, the potential difference between the word lines WL and the channel layer CH may be increased to be greater than the first potential difference 1Vdif, and electrons trapped in the memory cells may be tunneled into the channel layer CH due to the increased potential difference. It may be assumed that the maximum potential difference between the word lines WL and the channel layer CH is a second potential difference 2Vdif between the third time T3 and a fourth time T4, and that the potential difference is greater than the second potential difference 2Vdif from the fourth time T4. In other words, between the third time T3 and the fourth time T4, the potential difference between the word lines WL and the channel layer CH may be greater than the first potential difference 1Vdif and less than the second potential difference 2Vdif. The second potential difference 2Vdif may be the maximum potential difference by which back-tunneling does not occur. Therefore, between the third time T3 and the fourth time T4, only the electrons trapped in the memory cells may be tunneled into the channel layer CH, and a back-tunneling phenomenon in which the electrons of the word lines move to the memory cells might not occur.

To prevent or mitigate the back-tunneling phenomenon caused by the increase in the channel potential Pch, a second pass voltage 2Vpass greater than the first pass voltage 1Vpass may be applied to the word lines WL from the fourth time T4 when the back-tunneling phenomenon may occur. The second pass voltage 2Vpass may be set to a level which is greater than the first pass voltage 1Vpass and less than the erase voltage Vers. For example, a minimum level of the second pass voltage 2Vpass may be set to be greater than an increase variation of the channel potential Pch between the fourth time T4 and a fifth time T5. A maximum level of the second pass voltage 2Vpass may be set such that the potential difference between the word lines WL and the channel layer CH might not be lower than the first potential difference 1Vdif.

When the second pass voltage 2Vpass greater than the first pass voltage 1Vpass is applied to the word lines WL, the potential difference between the word lines WL and the channel layer CH may be reduced, so that the back-tunneling phenomenon may be prevented or mitigated. For example, the potential difference between the channel layer CH and the word lines WL to which the second pass voltage 2Vpass is applied may be a fourth potential difference 4Vdif less than a third potential difference 3Vdif by which a back-tunneling phenomenon may occur. Therefore, during the erase period ERS between the third time T3 and the fifth time T5, an erase operation may be performed without back-tunneling.

The discharge period DIS may start from the fifth time T5 when the erase period ERS ends. During the discharge period DIS, after a discharge operation starts to reduce the potential of the source line SL and the bit line BL, a discharge operation may start to reduce the potential of the word lines WL, the source select line SSL, and the drain select line DSL.

Figure 7A:
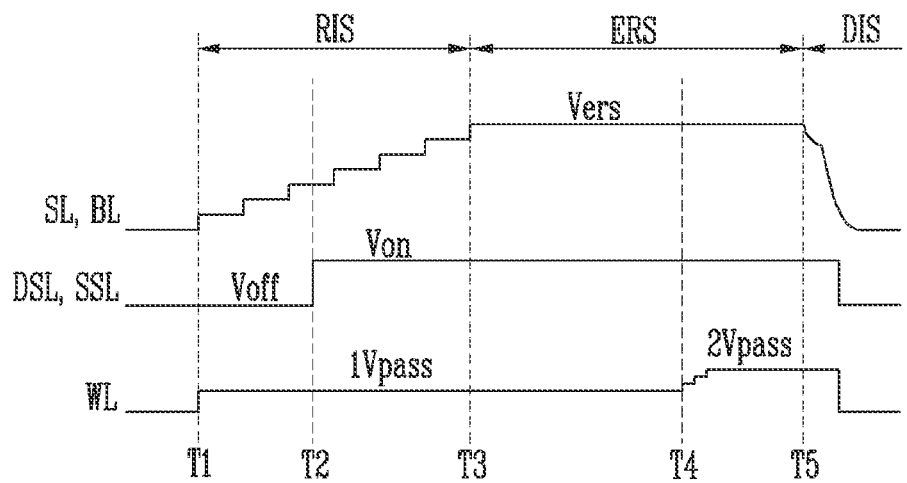
FIGS. 7A and 7B are diagrams illustrating an erase operation of a memory device according to a second embodiment.
Figure 7B:
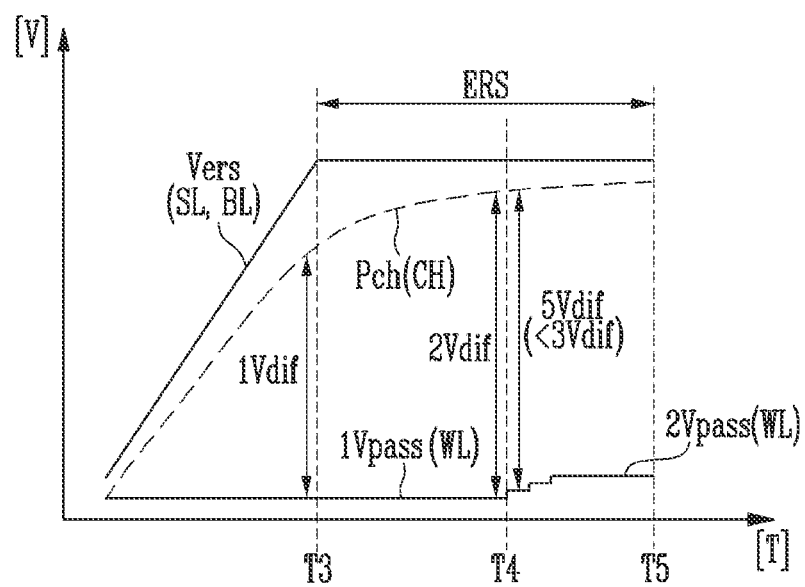

FIGS. 7A and 7B are diagrams illustrating an erase operation of a memory device according to a second embodiment.

Referring to FIGS. 7A and 7B, an erase operation may be divided into the voltage rise period RIS, the erase period ERS, and the discharge period DIS. During the erase operation, the voltage rise period RIS, the erase period ERS, and the discharge period DIS may proceed sequentially.

At the first time T1 when the voltage rise period RIS starts, the turn-off voltage Voff may be applied to the drain select line DSL and the source select line SSL, and the first pass voltage 1Vpass may be applied to the word lines WL. The first pass voltage 1Vpass may activate a channel of memory cells to form a current path and may be a positive voltage greater than 0 V. The turn-off voltage Voff may deactivate a channel of a drain select transistor and a source select transistor so as not to form a current path, and may be 0 V. The erase voltage Vers may be applied to the source line SL and the bit line BL. Since the erase voltage Vers is greater than the first pass voltage 1Vpass and is a high voltage for erasing memory cells, it would be difficult for the erase voltage Vers to have a target level from when the erase voltage Vers is applied to the source line SL and the bit line BL. Therefore, at the first time T1 when the erase voltage Vers starts to be applied to the source line SL and the bit lines BL, the voltage of the source line SL and the bit line BL may have lower levels than the target level and increase gradually. The target level of the erase voltage Vers may be set to a level at which memory cells are erased.

At the second time T2 before the level of the erase voltage Vers increases to the target level, the turn-on voltage Von may be applied to the drain select line DSL and the source select line SSL. The drain select transistor and the source select transistor may be turned on by the turn-on voltage Von, so that the source line SL and the bit line BL may be electrically coupled to the channel layer CH. As a result, the channel potential Pch of the channel layer CH may be increased. Although the channel potential Pch is increased, before the third time T3 when the erase voltage Vers increases to the target level, the memory cells might not be erased. Even when they are erased, the memory cells may be erased weaker than after the third time T3 when the erase voltage Vers increases to the target level. For example, during the voltage rise period RIS, when a maximum voltage difference between the word lines WL and the channel layer CH is the first voltage difference 1Vdif, electrons of the memory cells might not be tunneled by the first voltage difference 1Vdif. Even when they are tunneled, fewer electrons than after the third time T3 may be tunneled.

The erase period ERS may start from the third time T3 when the erase voltage Vers increases to the target level. From the third time T3, the erase voltage Vers having the target level may be maintained in the source line SL and the bit line BL. Even when the erase voltage Vers has the target level, the channel potential Pch may increase at a lower speed than the voltage of the source line SL and the bit line BL. As a result, even after the third time 3T passes, the channel potential Pch may gradually increase.

After the third time T3, the potential difference between the word lines WL and the channel layer CH may be greater than the first potential difference 1Vdif and electrons trapped in the memory cells may be tunneled into the channel layer CH due to the increased potential difference. It may be assumed that the maximum potential difference between the word lines WL and the channel layer CH is the second potential difference 2Vdif between the third time T3 and the fourth time T4 and the potential difference increases to be greater than the second potential difference 2Vdif from the fourth time T4. In other words, between the third time T3 and the fourth time T4, the potential difference between the word lines WL and the channel layer CH may be greater than the first potential difference 1Vdif and less than the second potential difference 2Vdif. The second potential difference 2Vdif may be the maximum potential difference by which back-tunneling does not occur. Therefore, between the third time T3 and the fourth time T4, only the electrons trapped in the memory cells may be tunneled into the channel layer CH, and a back-tunneling phenomenon in which the electrons of the word lines move to the memory cells might not occur.

To prevent or mitigate the back-tunneling phenomenon caused by the increased channel potential Pch, the second pass voltage 2Vpass greater than the first pass voltage Vpass1 may be gradually applied or applied to the word lines WL from the fourth time T4 when the back-tunneling phenomenon may occur. For example, at the fourth time T4, voltages which gradually increase or increase between the first pass voltage Vpass1 and the second pass voltage 2Vpass may be applied to the word lines WL. For example, at the fourth time T4, a voltage which is applied to the word lines WL may increase stepwise from the first pass voltage 1Vpass to the second pass voltage 2Vpass. The number of steps may vary depending on each memory device. By gradually increasing or increasing the second pass voltage 2Vpass applied to the word lines WL, a drastic change in the potential difference between the word lines WL and the channel layer CH may be prevented or mitigated. As a result, in an embodiment, the erase operation may be stably performed even during a period where the voltage applied to the word lines WL is increased.

A minimum level of the second pass voltage 2Vpass may be set to be greater than the increase of the channel potential Pch between the fourth time T4 and the fifth time T5. A maximum level of the second pass voltage 2Vpass may be set such that the potential difference between the word lines WL and the channel layer CH might not be lower than the first potential difference 1Vdif.

When the second pass voltage 2Vpass greater than the first pass voltage 1Vpass is applied to the word lines WL, the potential difference between the word lines WL and the channel layer CH may be reduced, so that a back-tunneling phenomenon may be prevented or mitigated. For example, the potential difference between and the channel layer CH and the word lines WL to which the second pass voltage 2Vpass is applied may be a fifth potential difference 5Vdif which is less than the third potential difference 3Vdif by which a back-tunneling phenomenon may occur. Therefore, during the erase period ERS between the third time T3 and the fifth time T5, an erase operation may be performed without back-tunneling.

The discharge period DIS may start from the fifth time T5 when the erase period ERS ends. During the discharge period DIS, after a discharge operation starts to reduce the potentials of the source line SL and the bit line BL, a discharge operation may start to reduce the potentials of the word lines WL, the source select line SSL and the drain select line DSL.

Figure 8A:
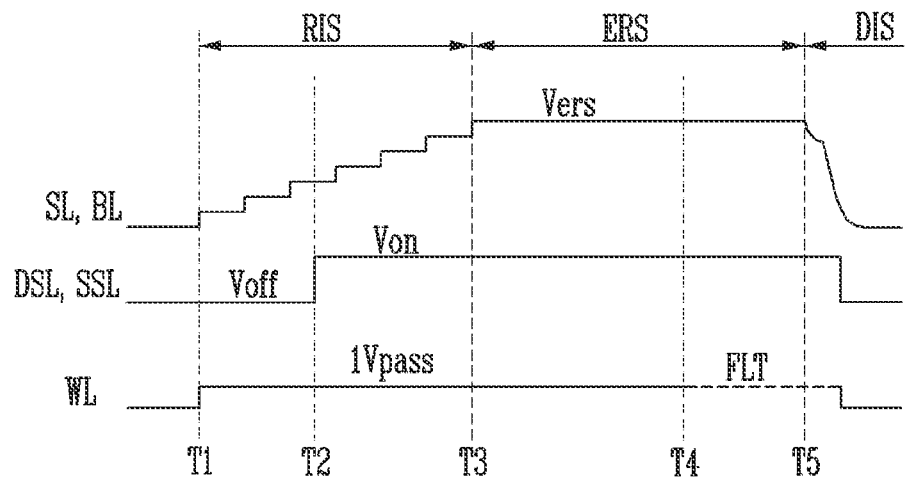
FIGS. 8A and 8B are diagrams illustrating an erase operation of a memory device according to a third embodiment.
Figure 8B:
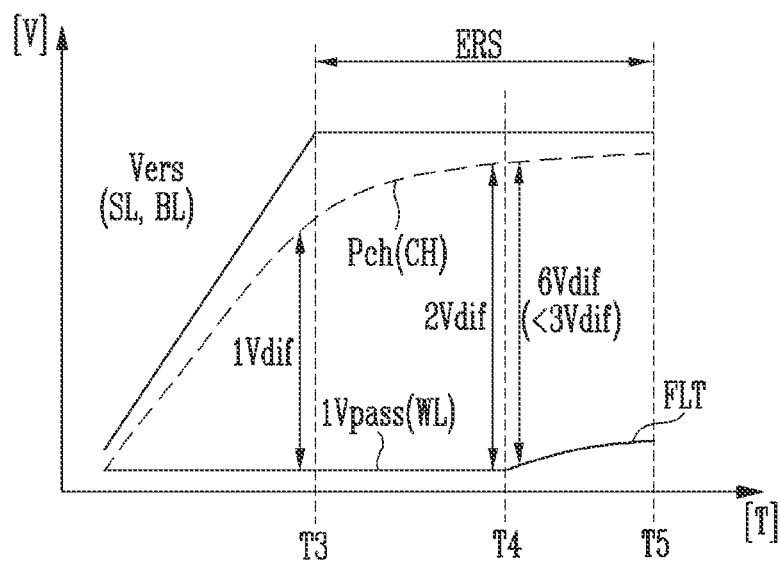

FIGS. 8A and 8B are diagrams illustrating an erase operation of a memory device according to a third embodiment.

Referring to FIGS. 8A and 8B, an erase operation may be divided into the voltage rise period RIS, the erase period ERS, and the discharge period DIS. During an erase operation, the voltage rise period RIS, the erase period ERS, and the discharge period DIS may proceed sequentially.

At the first time T1 when the voltage rise period RIS starts, the turn-off voltage Voff may be applied to the drain select line DSL and the source select line SSL, and the first pass voltage 1Vpass may be applied to the word lines WL. The turn-off voltage Voff may be 0 V. The first pass voltage 1Vpass may be a positive voltage greater than 0 V. The erase voltage Vers may be applied to the source line SL and the bit line BL. Since the erase voltage Vers is greater than the first pass voltage 1Vpass and is a high voltage for erasing memory cells, it would be difficult for the erase voltage Vers to have a target level from the time when the erase voltage Vers is applied to the source line SL and the bit line BL. Therefore, at the first time T1 when the erase voltage Vers starts to be applied to the source line SL and the bit lines BL, the voltage of the source line SL and the bit line BL may have a lower level than the target level and increase gradually or increase. The target level of the erase voltage Vers may be set to a level at which memory cells are erased.

The target level of the erase voltage Vers will be described below.

A potential of electrons trapped in the memory cells may be greater than that of the word lines WL and be tunneled into the channel layer CH due to the potential difference occurring at this time. The level of the erase voltage Vers which generates the potential difference may be set as a target level.

At the second time T2 before the level of the erase voltage Vers increases to the target level, the turn-on voltage Von may be applied to the drain select line DSL and the source select line SSL. The drain select transistor and the source select transistor may be turned on by the turn-on voltage Von, so that the source line SL and the bit line BL may be electrically coupled to the channel layer CH. As a result, the channel potential Pch of the channel layer CH may be increased. Although the channel potential Pch is increased, before the third time T3 when the erase voltage Vers increases to the target level, the memory cells might not be erased. Even when they are erased, the memory cells may be erased weaker than after the third time T3 when the erase voltage Vers increases to the target level. For example, during the voltage rise period RIS, when a maximum voltage difference between the word lines WL and the channel layer CH is the first voltage difference 1Vdif, electrons of the memory cells might not be tunneled by the first voltage difference 1Vdif. Even if they are tunneled, fewer electrons than after the third time T3 may be tunneled.

The erase period ERS may start from the third time T3 when the erase voltage Vers increases to the target level. From the third time T3, the erase voltage Vers having the target level may be maintained in the source line SL and the bit line BL. Even when the erase voltage Vers has the target level, the channel potential Pch may increase at a lower speed than the voltage of the source line SL and the bit line BL. As a result, even after the third time T3 passes, the channel potential Pch may gradually increase or increase.

After the third time T3, the potential difference between the word lines WL and the channel layer CH may be greater than the first potential difference 1Vdif and electrons trapped in the memory cells may be tunneled into the channel layer CH due to the increased potential difference. It may be assumed that the maximum potential difference between the word lines WL and the channel layer CH is the second potential difference 2Vdif between the third time T3 and the fourth time T4 and the potential difference increases to be greater than the second potential difference 2Vdif from the fourth time T4. In other words, the potential difference between the word lines WL and the channel layer CH may be greater than the first potential difference 1Vdif and less than the second potential difference 2Vdif between the third time T3 and the fourth time T4. The second potential difference 2Vdif may be the maximum potential difference by which back-tunneling does not occur. Therefore, between the third time T3 and the fourth time T4, only the electrons trapped in the memory cells may be tunneled into the channel layer CH, and a back-tunneling phenomenon in which the electrons of the word lines move to the memory cells might not occur.

To prevent or mitigate the back-tunneling phenomenon due to the increase in the channel potential Pch, the word lines WL may be floated (FLT) from the fourth time T4 when the back-tunneling phenomenon may occur. When the word lines WL are floated, the potential of the word lines WL may be boosted by the channel potential Pch. As a result, the potential difference between the word lines WL and the channel layer CH may be reduced, so that the back-tunneling phenomenon may be prevented or mitigated. For example, the potential difference between the floated word lines WL and the channel layer CH may be a sixth potential difference 6Vdif which is less than the third potential difference 3Vdif by which a back-tunneling phenomenon may occur. Therefore, during the erase period ERS from the third time T3 to the fifth time T5, the erase operation may be performed without back-tunneling.

The discharge period DIS may start from the fifth time T5 when the erase period ERS ends. During the discharge period DIS, after a discharge operation starts to reduce the potentials of the source line SL and the bit line BL, a discharge operation may start to reduce the potentials of the word lines WL, the source line SL, and the bit line BL.

Figure 9:
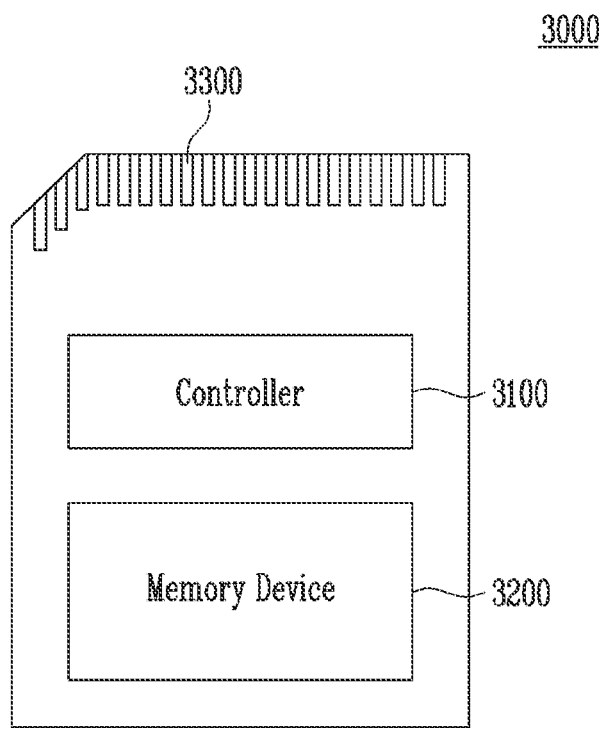
FIG. 9 is a diagram illustrating an embodiment of a memory card system to which a memory device according to the present disclosure is applied.

FIG. 9 is a block diagram illustrating a memory card system 3000 according to an embodiment of the present disclosure.

Referring to FIG. 9, the memory card system 3000 may include a controller 3100, a memory device 3200, and a connector 3300.

The controller 3100 may be coupled to the memory device 3200. The controller 3100 may access the memory device 3200. For example, the controller 3100 may control a program, read, or erase operation, or a background operation of the memory device 3200. The controller 3100 may be configured to provide an interface between the memory device 3200 and the host. The controller 3100 may be configured to drive firmware for controlling the memory device 3200. For example, the controller 3100 may include components, such as a Random Access Memory (RAM), a host interface, a memory interface, and an ECC circuit etc.

The controller 3100 may communicate with an external device through the connector 3300. The controller 3100 may communicate with an external device (e.g., host) based on a specific communication protocol. In an embodiment, the controller 3100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wifi, Bluetooth, and nonvolatile memory express (NVMe) protocols etc. In an embodiment, the connector 3300 may be defined by at least one of the above-described various communication protocols.

The memory device 3200 may include a plurality of memory cells and be configured in the same manner as described with reference to FIG. 1. Therefore, the memory device 3200 may control a soft program operation for increasing threshold voltages of dummy cells.

The controller 3100 and the memory device 3200 may be integrated into a single semiconductor device to form a memory card. For example, the controller 3100 and the memory device 3200 may be integrated into a single semiconductor device to form a memory card, such as a personal computer memory card international association (PCMCIA) card, a compact flash (CF) card, a smart media card (SM, or SMC), a memory stick, a multimedia card (MMC, RS-MMC, MMCmicro, or eMMC), an SD card (SD, miniSD, microSD, or SDHC), a universal flash storage (UFS), and the like.

Figure 10:
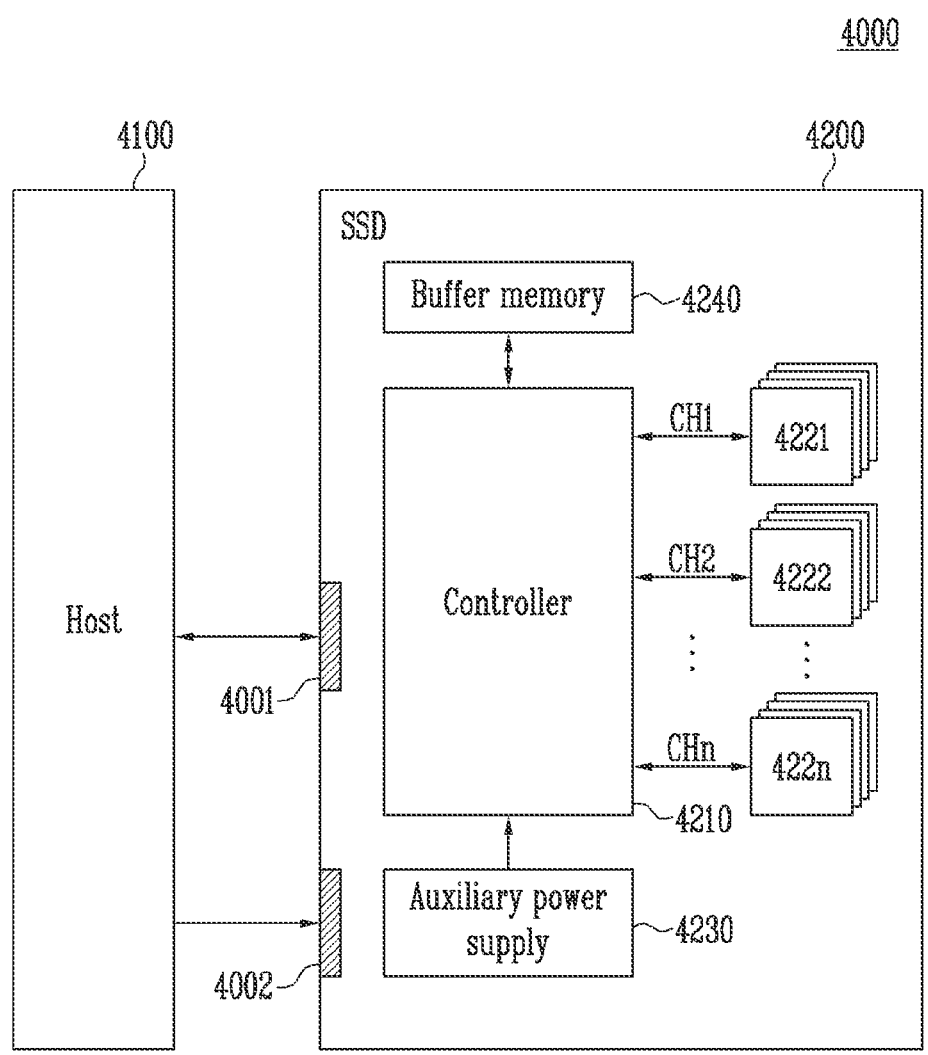
FIG. 10 is a diagram illustrating an embodiment of a solid state drive (SSD) system to which a memory device according to the present disclosure is applied.

FIG. 10 is a block diagram illustrating a solid state drive (SSD) system 4000 according to an embodiment of the present disclosure.

Referring to FIG. 10, the SSD system 4000 may include a host 4100 and an SSD 4200. The SSD 4200 may exchange signals with the host 4100 through a signal connector 4001 and may receive power through a power connector 4002. The SSD 4200 may include a controller 4210, a plurality of memory devices 4221 to 422n, an auxiliary power supply 4230, and a buffer memory 4240.

The controller 4210 may control the plurality of memory devices 4221 to 422n in response to the signals received from the host 4100. In an embodiment, the signals may be based on the interfaces of the host 4100 and the SSD 4200. For example, the signals may be defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wifi, Bluetooth, and nonvolatile memory express (NVMe) interfaces etc.

The plurality of memory devices 4221 to 422n may include a plurality of memory cells which are configured to store data. The plurality of memory devices 4221 to 422n may be configured in the same manner as the memory device 100 shown in FIG. 1. Therefore, each of the plurality of memory devices 4221 to 422n may communicate with the controller 4210 through the channels CH1 to CHn.

The auxiliary power supply 4230 may be coupled to the host 4100 through the power connector 4002. The auxiliary power supply 4230 may be supplied and charged with the power from the host 4100. The auxiliary power supply 4230 may supply the power of the SSD 4200 when the power is not smoothly supplied from the host 4100 or when the power supply received from the host 4100 is interrupted. In an embodiment, the auxiliary power supply 4230 may be positioned inside or outside the SSD 4200. For example, the auxiliary power supply 4230 may be disposed in a main board and may supply auxiliary power to the SSD 4200.

The buffer memory 4240 may serve as a buffer memory of the SSD 4200. For example, the buffer memory 4240 may temporarily store or store data received from the host 4100 or data received from the plurality of memory devices 4221 to 422n, or may temporarily store or store metadata (e.g., mapping tables) of the memory devices 4221 to 422n. The buffer memory 4240 may include volatile memories such as DRAM, SDRAM, DDR SDRAM, and LPDDR SDRAM, or nonvolatile memories such as FRAM, ReRAM, STT-MRAM, and PRAM etc.

According to an embodiment of the present disclosure, a back-tunneling phenomenon may be prevented or mitigated during an erase operation of a memory device. Therefore, in an embodiment, reliability of the erase operation of the memory device may be improved.

It will be apparent to those skilled in the art that various modifications can be made to the above-described embodiments without departing from the spirit or scope of the description. Thus, it is intended that the embodiments cover all such modifications provided and come within the scope of the appended claims and their equivalents.

What is claimed is:

1. A memory device, comprising:
   a first select transistor, a memory cell, and a second select transistor coupled in series between a source line and a bit line; and
   a peripheral circuit configured to perform an erase operation on the memory cell,
   wherein the peripheral circuit is configured to, during the erase operation:
   apply an erase voltage to the source line and the bit line and a first pass voltage to a word line coupled to the memory cell at a first time,
   apply a turn-on voltage to a first select line coupled to the first select transistor and a second select line coupled to the second select transistor at a second time before a level of the erase voltage applied to the source line and the bit line increases to a target level,
   erase the memory cell by maintaining the erase voltage, the first pass voltage, and the turn-on voltage at a third time when the level of the erase voltage applied to the source line and the bit line equals the target level, and
   erase the memory cell by reducing a voltage difference between the memory cell and the word line at a fourth time after the third time.

2. The memory device of claim 1, wherein the peripheral circuit includes a voltage generator configured to generate and output the erase voltage, the first pass voltage, and the turn-on voltage.

3. The memory device of claim 1, wherein the peripheral circuit is configured to generate and output the first pass voltage, the turn-on voltage greater than the first pass voltage, and the erase voltage greater than the turn-on voltage.

4. The memory device of claim 1, wherein the peripheral circuit is configured to set the fourth time before back-tunneling in which electrons flow into the memory cell occurs after the third time.

5. The memory device of claim 1, wherein the peripheral circuit is configured to apply a second pass voltage greater than the first pass voltage to the word line at the fourth time.

6. The memory device of claim 5, wherein the peripheral circuit is configured to increase the first pass voltage applied to the word line to the second pass voltage.

7. The memory device of claim 1, wherein the peripheral circuit is configured to float the word line at the fourth time.

8. A method of operating a memory device, the method comprising:
   applying an erase voltage to a source line and a bit line, applying a turn-off voltage to first and second select lines between the source line and the bit line, and applying a first pass voltage to a word line between the first and second select lines;
   applying a turn-on voltage to the first and second select lines before a level of the erase voltage equals a target level; and
   applying a second pass voltage greater than the first pass voltage to the word line after a predetermined time from a time when the level of the erase voltage equals the target level.

9. The method of claim 8, wherein the first pass voltage is greater than the turn-off voltage and less than the turn-on voltage.

10. The method of claim 8, wherein the erase voltage is greater than the turn-on voltage, the first pass voltage, and the second pass voltage.

11. The method of claim 8, wherein during the applying of the second pass voltage, the second pass voltage is increased from the first pass voltage.

12. The method of claim 8, further comprising, after applying the second pass voltage, discharging the source line, the bit line, the first and second select lines, and the word line.

13. A method of operating a memory device, the method comprising:
   applying an erase voltage to a source line and a bit line, applying a turn-off voltage to first and second select lines between the source line and the bit line, and applying a pass voltage to a word line between the first and second select lines;
   applying a turn-on voltage to the first and second select lines before a level of the erase voltage equals a target level; and
   floating the word line after a predetermined time from a time when the level of the erase voltage equals the target level.

* * * * *